United States Patent
Kawakatsu et al.

(10) Patent No.: US 10,583,405 B2
(45) Date of Patent: Mar. 10, 2020

(54) PERMSELECTIVE MEMBRANE, METHOD FOR PRODUCING SAME, AND WATER TREATMENT METHOD USING THE PERMSELECTIVE MEMBRANE

(71) Applicants: KURITA WATER INDUSTRIES LTD., Tokyo (JP); NATIONAL UNIVERSITY CORPORATION KOBE UNIVERSITY, Kobe-shi, Hyogo (JP)

(72) Inventors: Takahiro Kawakatsu, Koga (JP); Hideto Matsuyama, Kobe (JP); Daisuke Saeki, Nagano (JP); Toru Takai, Kobe (JP)

(73) Assignees: KURITA WATER INDUSTRIES LTD., Tokyo (JP); NATIONAL UNIVERSITY CORPORATION KOBE UNIVERSITY, Kobe-Shi, Hyogo (JP)

( * ) Notice: Subject to any disclaimer, the term of this patent is extended or adjusted under 35 U.S.C. 154(b) by 82 days.

(21) Appl. No.: 16/077,310

(22) PCT Filed: Mar. 3, 2017

(86) PCT No.: PCT/JP2017/008486
§ 371 (c)(1),
(2) Date: Aug. 10, 2018

(87) PCT Pub. No.: WO2017/150705
PCT Pub. Date: Sep. 8, 2017

(65) Prior Publication Data
US 2019/0046933 A1    Feb. 14, 2019

(30) Foreign Application Priority Data

Mar. 4, 2016   (JP) ................. 2016-042103

(51) Int. Cl.
*B01D 69/12* (2006.01)
*B01D 71/06* (2006.01)
(Continued)

(52) U.S. Cl.
CPC ......... *B01D 69/12* (2013.01); *B01D 67/0013* (2013.01); *B01D 69/105* (2013.01);
(Continued)

(58) Field of Classification Search
CPC .... B01D 69/12; B01D 71/74; B01D 67/0013; B01D 69/105; B01D 69/144; B01D 71/06;
(Continued)

(56) References Cited

U.S. PATENT DOCUMENTS

2007/0218119 A1    9/2007   Verma et al.
2009/0007555 A1    1/2009   Jensen
(Continued)

FOREIGN PATENT DOCUMENTS

JP    2008-501782 A    1/2008
JP    2008-540108 A    11/2008
(Continued)

OTHER PUBLICATIONS

Shinnosuke Aizu et al., Development of reverse osmosis membrane incorporating phospholipid bilayer as separation function layer, 43rd Autumn Meeting of The Society of Chemical Engineers, Japan, 1220, 2011 NPL4: Vertut-Croquin, A. et al., Biochemistry, vol. 22, pp. 2939-2944, 1983 (Year: 1983).*
(Continued)

*Primary Examiner* — Taiwo Oladapo
(74) *Attorney, Agent, or Firm* — Manabu Kanesaka

(57) ABSTRACT

The present invention provides a RO membrane or a FO membrane comprising a coating layer made of a phospholipid bilayer membrane and formed on a surface of a porous
(Continued)

membrane body, having a high water permeate flow rate and salt rejection performance, the membrane being a permselective membrane comprising a porous membrane having a pore size of 5 nm to 50 nm and a coating layer made of a phospholipid bilayer and formed on a surface of the porous membrane, wherein (i) the phospholipid bilayer comprises phospholipid, amphotericin B, and ergosterol; (ii) a content of the amphotericin B is 3 to 20 mol % based on the phospholipid bilayer; (iii) a total content of the ergosterol and the amphotericin B in the phospholipid bilayer is 10 to 30 mol %.

7 Claims, 4 Drawing Sheets

(51) Int. Cl.
    *C02F 1/44*     (2006.01)
    *B01D 71/74*     (2006.01)
    *B01D 67/00*     (2006.01)
    *B01D 69/10*     (2006.01)
    *B01D 69/14*     (2006.01)
    B01D 61/00     (2006.01)
    B01D 61/02     (2006.01)
    C02F 103/08     (2006.01)

(52) U.S. Cl.
    CPC .......... *B01D 69/144* (2013.01); *B01D 71/06* (2013.01); *B01D 71/74* (2013.01); *C02F 1/44* (2013.01); *C02F 1/445* (2013.01); *B01D 61/002* (2013.01); *B01D 61/025* (2013.01); *B01D 2323/12* (2013.01); *C02F 1/441* (2013.01); *C02F 2103/08* (2013.01)

(58) Field of Classification Search
    CPC .............. B01D 2323/12; B01D 61/002; B01D 61/025; C02F 1/44; C02F 1/445; C02F 1/441; C02F 2103/08
    See application file for complete search history.

(56) References Cited

U.S. PATENT DOCUMENTS

| | | |
|---|---|---|
| 2011/0020950 A1 | 1/2011 | Vogel et al. |
| 2011/0284456 A1 | 11/2011 | Brozell |
| 2012/0152841 A1 | 6/2012 | Vissing et al. |
| 2014/0332468 A1 | 11/2014 | Tang et al. |

FOREIGN PATENT DOCUMENTS

| | | | |
|---|---|---|---|
| JP | 2012100645 A | * | 5/2012 |
| JP | 2012-192408 A | | 10/2012 |
| JP | 2013-532054 A | | 8/2013 |
| JP | 2014-504209 A | | 2/2014 |
| JP | 2014-100645 A | | 6/2014 |
| WO | 2009/074155 A1 | | 6/2009 |
| WO | 2013/043118 A1 | | 3/2013 |

OTHER PUBLICATIONS

PCT International Search Report of PCT/JP2017/008486, dated May 23, 2017.
NPL: A new Technique to fabricate high-performance biologically inspired membranes for water treatment; Priyesh Wagh et al.; vol. 156, pp. 754-765.
Specification NPL1: Pohl, P et al., Proceedings of the National Academy of Sciences 2001, 98, 9624-9629; Highly selective water channel activity measured by voltage clamp; Analysis of planar lipid bilayers reconstituted with purified AqpZ.
Specification NPL2: Habel, J. et al., Proceedings of the 10th International Congress on Membranes and Membrane Processes, pp. 1300, 2014; Biomimetic Polymeric membranes for osmosis applications.
Specification NPL3: Shinnosuke Aizu et al., Development of reverse osmosis membrane incorporating phospholipid bilayer as separation function layer, 43rd Autumn Meeting of The Society of Chemical Engineers, Japan, I220, 2011.
Specification NPL4: Vertut-Croquin, A. et al., Biochemistry, vol. 22, pp. 2939-2944, 1983; Differences in the interaction of the polyene antibiotic amphotericin B with cholesterol- or ergosterol-containing phospholipid vesicles. A circular dichroism and permeability study.
Specification NPL5: Kasai, Y. et al., Chem Eur. J., vol. 14, pp. 1178-1185, 2008; Self-Assembled Amphotericin B Is Probably Surrounded by Ergosterol; Bimolecular Interactions as Evidenced by Solid-State NMR and CD Spectra.
Specification NPL6: Kim, J. et al., Arch. Pharm Res., vol. 18, No. 2, pp. 84-89, 1995; Complexation of Amphotericin B With Egg Phosphatidylcholine Liposomes.

* cited by examiner

PERMSELECTIVE MEMBRANE, METHOD FOR PRODUCING SAME, AND WATER TREATMENT METHOD USING THE PERMSELECTIVE MEMBRANE

RELATED APPLICATIONS

The present application is National Phase of International Application No. PCT/JP2017/008486 filed Mar. 3, 2017, and claims priority from Japanese Application No. 2016-042103, filed Mar. 4, 2016, the disclosure of which is hereby incorporated by reference herein in its entirety.

TECHNICAL FIELD

The present invention relates to a permselective membrane used in the field of water treatment and a production method thereof and, in particular, relates to a permselective membrane comprising a coating layer made of a phospholipid bilayer membrane and a production method thereof.

BACKGROUND ART

Reverse osmosis (RO) membranes are widely used as permselective membranes in the field of desalination of sea water and salt water, production of industrial water and ultrapure water, waste water recovery, and the like. RO membrane treatment has the advantage of being highly capable of removing ions and low molecular weight organic matter but, on the other hand, requires a higher operating pressure than microfiltration (MF) membranes and ultrafiltration (UF) membranes. In order to increase the water permeability of RO membranes, for example, in polyamide RO membranes, efforts have been made such as controlling the pleated structure of a skin layer to increase the surface area.

In recent years, aquaporin, which is a membrane protein that selectively transports water molecules, attracts attention as a water channel substance, and it is suggested that a phospholipid bilayer membrane incorporating this protein may have a theoretically greater water permeability than conventional polyamide RO membranes (Non Patent Literature 1).

Examples of methods for producing a permselective membrane comprising a phospholipid bilayer membrane that incorporates a water channel substance include a method involving sandwiching between porous supports a lipid bilayer that incorporates a water channel substance, a method involving incorporating a lipid bilayer inside the pores of a porous support, a method involving forming a lipid bilayer around a hydrophobic membrane, and the like (Patent Literature 1).

The method involving sandwiching a phospholipid bilayer membrane between porous supports increases the pressure resistance of the phospholipid bilayer membrane but has problems in that, for example, the porous supports themselves that are brought into contact with water to be treated may be contaminated, concentration polarization may occur in the porous supports and greatly deteriorate the rejection, and the porous supports may serve as resistance and deteriorate water permeability.

Aquaporin A/S of Denmark manufactures RD membranes incorporating aquaporin in a polymer matrix, but the water permeability is only about 1.2 times the water permeability of existing RO membranes, and Non Patent Literature 2 fails to provide a clear description.

In Patent Literature 2, a cationic phospholipid is used to securely support a channel substance on a nanofiltration (NF) membrane, but there is a problem in that it is difficult to cause the intrinsic water permeability of the channel substance to be exerted because the resistance of the NF membrane itself is large.

Non Patent Literature 3 reports the results of supporting phospholipid on a NF membrane to introduce channel-substance amphotericin B, and the water permeation rate is 0.3 L/(m²·h·atm) or less. With the water permeation rate at a 0 to 1 L/(m²·h·atm) level, because ergosterol itself that is caused to be concomitantly present with amphotericin B also has a water permeability increasing effect, there is a problem in that optimum amounts of amphotericin B and ergosterol to be added are not clear.

Concerning these substances it is known that amphotericin B does not form channels when ergosterol is not concomitantly present. When channel formation is evaluated based on the circular dichroism (CD) spectrum of a phospholipid vesicle dispersion, a positive peak appears at 330 nm with amphotericin B alone and, in the case where ergosterol is present and channels are formed, a positive peak appears at 340 to 350 nm, and a negative peak appears at 370 nm and 390 nm (Non Patent Literatures 4 and 5).

However, there is also a report that a CD spectrum obtained in the absence of ergosterol shows peaks detected in similar regions (Non Patent Literature 6), and thus the optimum relationship between amphotericin B and ergosterol necessary for preparing a RO membrane or a forward osmosis (FO) membrane is not known.

CITATION LIST

Patent Literature

PTL1: JP 2012-192408 A
PTL2: JP 2014-100645 A

Non Patent Literature

NPL1: Pohl, P et al., Proceedings of the National Academy of Sciences 2001, 98, 9624-9629.
NPL2: Habel, J. et al., Proceedings of the 10th International Congress on Membranes and Membrane Processes, pp. 1300, 2014.
NPL3: Shinnosuke Aizu et al., Development of reverse osmosis membrane incorporating phospholipid bilayer as separation function layer, 43rd Autumn Meeting of The Society of Chemical Engineers, Japan, 1220, 2011
NPL4: Vertut-Croquin, A. et al., Biochemistry, Vol. 22, pp. 2939-2944, 1983.
NPL5: Kasai, Y. et al., Chem. Eur. J., Vol. 14, pp. 1178-1185, 2008.
NPL6: Kim, J. et al., Arch. Pharm. Res., Vol. 18, No. 2, pp. 84-89, 1995.

SUMMARY OF INVENTION

The method involving supporting a phospholipid bilayer containing amphotericin B as a channel substance on a NF membrane having a small pore size as a porous membrane cannot provide an increased amount of permeate water. On the other hand, supporting phospholipid on a porous membrane having a large pore size such as a microfiltration membrane results in a pressure resistance problem.

Accordingly, the present inventors conducted diligent research on a suitable pore size of a porous membrane.

Furthermore, concerning a permselective membrane comprising a porous membrane body having selective permeability and a coating layer made of a phospholipid bilayer membrane and formed on the surface of the porous membrane body, the inventors conducted diligent research on the relationship in the phospholipid bilayer between the optimum concentration for amphotericin B to form channels and the concentration of ergosterol added, to prepare a RO membrane or a FO membrane that has a high water permeate flow rare and salt rejection performance, and accomplished the present invention.

An object of the present invention is to provide a RD membrane or a FO membrane that has a high water permeate flow rate and salt rejection performance, the membrane comprising a porous membrane body having selective permeability and a coating layer made of a phospholipid bilayer membrane and formed on the surface of the porous membrane body.

As a result of having conducted diligent research to solve the above problems of conventional art, the inventors found that the above object can be achieved by a permselective membrane comprising: a coating layer that is made of a phospholipid bilayer comprising amphotericin B as a channel substance and ergosterol in a predetermined range and that is provided on the surface of a porous membrane having a specific alkyl group on the surface of a porous membrane body and having a pore size of 5 nm to 50 nm.

That is to say, the present invention provides [1] to [7] below.

[1] A permselective membrane comprising a porous membrane having a pore size of 5 nm to 50 nm and a coating layer made of a phospholipid bilayer and formed on a surface of the porous membrane, wherein
(i) the phospholipid bilayer comprises phospholipid, amphotericin B, and ergosterol;
(ii) a content of the amphotericin B is 3 to 20 mol % based on the phospholipid bilayer; and
(iii) a total content of the ergosterol and the amphotericin B in the phospholipid bilayer is 10 to 30 mol %.

[2] The permselective membrane according to [1], wherein an alkyl group having 1 to 30 carbon atoms is bonded to the surface of the porous membrane.

[3] The permselective membrane according to [1] or [2], wherein the phospholipid comprises palmitoyloleoylphosphatidylcholine (POPC).

[4] A method for producing a permselective membrane comprising a porous membrane having a pore size of 5 nm to 50 nm and a coating layer made of a phospholipid bilayer comprising phospholipid and a channel substance and formed on a surface of the porous membrane,
the method comprising a step of forming the coating layer made of the phospholipid bilayer on the surface of the porous membrane by bringing a coating layer forming liquid satisfying (i) to (iii) below and the porous membrane into contact:
(i) the coating layer forming liquid comprises phospholipid, a channel substance, and ergosterol;
(ii) the channel substance is amphotericin B, and the coating layer forming liquid has an amphotericin B concentration of 3 to 20 mol %; and
(iii) a total content of the ergosterol and the amphotericin B in the coating layer forming liquid is 10 to 30 mol %.

[5] The method for producing a permselective membrane according to [4], further comprising a step of forming the porous membrane by bonding an alkyl group having 1 to 30 carbon atoms to the porous membrane, the step being performed prior to the step of forming the coating layer made of the phospholipid bilayer on the surface of the porous membrane.

[6] The method for producing a permselective membrane according to [4] or [5], wherein the phospholipid comprises palmitoyloleoylphosphatidylcholine (POPC).

[7] A method for treating water, comprising a step of subjecting water to be treated to a membrane separation treatment using the permselective membrane of any one of [1] to [3].

REFERENCE SIGNS LIST

Figure 1:
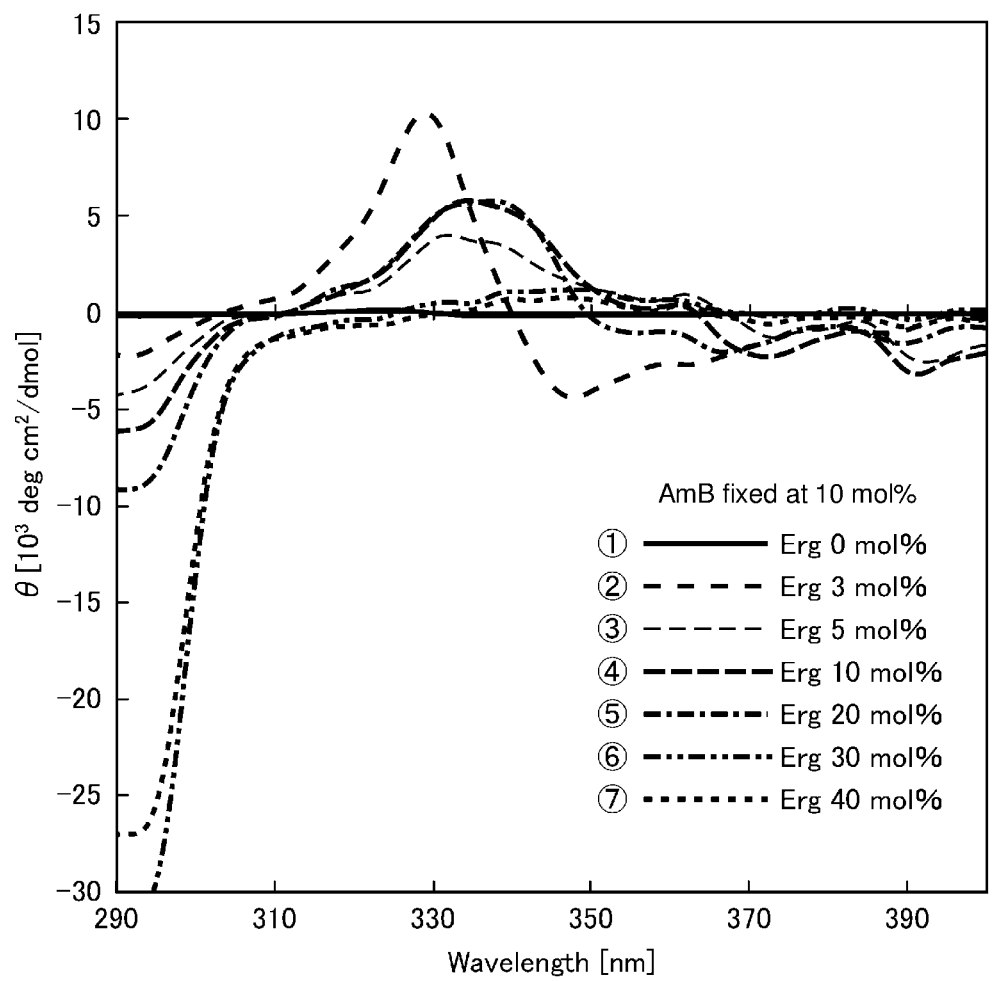
FIG. 1 shows CD spectra for evaluating the channel formation of membranes prepared with the concentration (content) of amphotericin B being fixed at 10 mol %.

1 Permselective membrane
2 Phospholipid bilayer
3 Porous membrane (body)
4, 5 Container
6 Stirrer

DESCRIPTION OF EMBODIMENTS

The permselective membrane of the present invention is a permselective membrane comprising a porous membrane having a pore size of 5 nm to 50 nm and a coating layer made of a phospholipid bilayer and formed on a surface of the porous membrane, wherein
(i) the phospholipid bilayer comprises phospholipid, amphotericin B, and ergosterol;
(ii) a content of the amphotericin B is 3 to 20 mol % based on the phospholipid bilayer; and
(iii) a total content of the ergosterol and the amphotericin B in the phospholipid bilayer is 10 to 30 mol %.

Furthermore, in a suitable embodiment of the permselective membrane, an alkyl group having 1 to 30 carbon atoms is bonded to the surface of the porous membrane.

The method for producing a permselective membrane of the present invention is a method for producing a permselective membrane comprising a porous membrane having a pore size of 5 nm to 50 nm and a coating layer made of a phospholipid bilayer comprising phospholipid and a channel substance and formed on a surface of the porous membrane,
the method comprising a step of forming the coating layer made of the phospholipid bilayer on the surface of the porous membrane by bringing a coating layer forming liquid satisfying (i) to (iii) below and the porous membrane into contact:
(i) the coating layer forming liquid comprises phospholipid, a channel substance, and ergosterol;
(ii) the channel substance is amphotericin B, and the coating layer forming liquid has an amphotericin B concentration of 3 to 20 mol %; and
(iii) a total content of the ergosterol and the amphotericin B in the coating layer forming liquid is 10 to 30 mol %.

In the present invention, the constituent features of the permselective membrane as an invention of a product and the features of the coating layer forming liquid in the production method are mostly the same and, therefore, are described in the rest of the description without particularly distinguishing between the invention of the product and the invention of the production method.

[Porous Membrane Body]

The porous membrane body is not particularly limited as long as it is a porous membrane having a pore size of 5 nm to 50 nm, and examples of suitable materials of the membrane include cellulose, polyether sulfone, polyvinylidene fluoride, alumina, zirconia, and the like.

The porous membrane body used in the present invention is characterized by the pore size of 5 nm to 50 nm. A pore size of less than 5 nm result in poor water permeability, and a pore size exceeding 50 nm results in a pressure resistance problem. This pore size range corresponds to the category of UF membranes, and the corresponding molecular weight cutoff is 10000 to 1500000.

Here, the method for measuring the pore size in the present invention is an air flow method. The air flow method is a method for measuring the pore size of a membrane as described in ASTM F306, and is capable of measuring a pore size in the range of 15 nm to 180 μm. As for the average pore size of a membrane having a pore size distribution, a pore size calculated with a pressure corresponding to half of the overall amount of permeate gas is used. In the case of pores having 1 nm to 15 nm, the average pore size is obtained using the Kelvin equation from the permeate flow rate of nitrogen gas containing water vapor or n-hexane vapor according to a Non Patent Literature (Tsuru, T. et al., J. Membrane Sci., Vol. 149, pp. 127-135, 1998) and JP 5426367 B.

The porous membrane used in the present invention preferably comprises a porous membrane body and an alkyl group that has 1 to 30 carbon atoms and that is bonded to the surface of the porous membrane body. By bonding an alkyl group having 1 to 30 carbon atoms to the surface, adhesion to the coating layer made of a phospholipid bilayer can be improved. The kind of alkyl group is not particularly limited, and may have a substituent such as a fluoro group, a chloro group, an amino group, or a carboxyl group. The alkyl group may be linear or branched. From the viewpoint of further improving adhesion to the coating layer made of a phospholipid bilayer, a linear alkyl group is preferable. The alkyl group is preferably bonded as an alkylating silane coupling agent to the surface of the porous membrane body. When the number of carbon atoms of the alkyl group is in the range of 1 to 30, there are no such inconveniences that the porous membrane (body) and the coating layer made of a phospholipid bilayer are separated, and filtration cannot be performed, in the process of subjecting water to be treated to a membrane separation treatment using the permselective membrane. The number of carbon atoms of the alkyl group is preferably 6 to 25 and particularly preferably 8 to 20. A preferable alkylating silane coupling agent may be a methoxysilane coupling agent, a trimethoxysilane coupling agent, an ethoxysilane coupling agent, a triethoxysilane coupling agent, a chlorosilane coupling agent, and a trichlorosilane coupling agent having the aforementioned number of carbon atoms, and a particularly preferable coupling agent from the viewpoint of hydrophobicity and reactivity may be octadecyltrichlorosilane having 18 carbon atoms.

The method for bonding an alkyl group is, for example, a method involving immersing the porous membrane body in an alkylating silane coupling agent solution. Furthermore, it is preferable to make the surface of the porous membrane body hydrophilic by plasma treatment prior to the alkylating silane coupling agent treatment.

The amount of the alkyl group bonded to the porous membrane body is preferably such that the contact angle of a water droplet is 100 degrees or more.

Examples of the phospholipid used in the present invention include palmitoyloleoylphosphatidylcholine (POPC), dipalmitoylphosphatidylcholine (DPPC), dimyristoylphosphatidylcholine (DMPC), distearoylphosphatidylcholine (DSPC), and the like. Among these, palmitoyloleoylphosphatidylcholine (POPC) is particularly recommended from the viewpoint of imparting flowability and a suitable thickness to the lipid bilayer.

In the present invention, the phospholipid bilayer comprises phospholipid and a channel substance. The channel substance forms pores in the phospholipid bilayer and forms channels that facilitate permeation of water, and amphotericin B is used.

[Method for Coating with Phospholipid Bilayer]

Examples of the method for coating the surface of the porous membrane body with the coating layer (hereinafter sometimes referred to as a "phospholipid bilayer membrane") made of a phospholipid bilayer include a Langmuir-Blodgett method and a vesicle fusion method.

When forming the phospholipid bilayer membrane by a vesicle fusion method, first, phospholipid, preferably together with amphotericin B as a channel substance and ergosterol, is dissolved in a solvent. Chloroform, a chloroform/methanol mixture, or the like can be used as a solvent.

The proportions of phospholipid and channel-substance amphotericin B mixed are suitably such that the content of amphotericin B in the phospholipid bilayer is 3 to 20 mol % and particularly 5 to 10 mol %.

The proportions of phospholipid, channel-substance amphotericin B, and ergosterol mixed are such that the total content of amphotericin B and ergosterol is 10 to 30 mol %, more preferably 10 to 25 mol %, even more preferably 13 to 25 mol %, and particularly suitably 13 to 20 mol % based on the total of the three substances.

The upper limit of the ergosterol content in the phospholipid bilayer is 27 mol %, and the ergosterol content is suitably about 3 to 20 mol % in particular.

Next, a 0.3 to 50 mM, particularly 1 to 30 mM solution of phospholipid and a channel substance, wherein ergosterol is contained, is prepared and then dried under reduced pressure to thereby provide a dry lipid membrane. Pure water is added thereto, and the mixture is heated to a temperature higher than the phase transition temperature of phospholipid to thereby provide a dispersion of vesicles having a spherical shell form.

In one embodiment of the present invention, by a freeze-thaw method wherein this vesicle dispersion is first brought into a frozen state in liquid nitrogen and then a molten state at a temperature higher than the phase transition temperature of phospholipid in a repeated manner, vesicle particles are grown, and also the number of phospholipid bi-molecular membranes constituting the vesicle is reduced. Then, this vesicle dispersion is filtered through a membrane (such as a track-etched polycarbonate membrane) having a pore size of 0.05 to 0.4 μm to form a dispersion of spherical-shell vesicles that has a pore size of 0.05 to 0.4 μm or less and that is composed of a single phospholipid bi-molecular membrane.

In another embodiment of the present invention, the vesicle dispersion is used as-is without performing such a freeze-thaw treatment.

The average particle size of vesicles in the vesicle dispersion used in the present invention is preferably 0.05 to 0.4 μm and particularly preferably 0.1 to 0.2 μm.

The average particle size of vesicles in the vesicle dispersion is a value calculated by a dynamic light scattering method.

The vesicle dispersion is brought into contact with the porous membrane, and the porous membrane is retained in contact with the vesicle dispersion for about 0.5 to 6 hours and, in particular, 1 to 3 hours to thereby cause the vesicles to be adsorbed onto the surface of the porous membrane and form the coating layer made of a phospholipid bilayer membrane. Thereafter, the coating layer-furnished porous membrane is removed from the solution and, as necessary, washed with ultrapure water or pure water, and thereby a permselective membrane comprising coating layers (1 to 30 layers) made of a phospholipid bilayer membrane is obtained.

The thickness of the phospholipid bilayer membrane is preferably 1 to 30 layers and, in particular, about 1 to 15 layers. The number of layers in terms of the thickness of the phospholipid bilayer membrane can be verified by quantifying phosphorus by a Bartlett method (Bartlett, G. R, J. Biol. Chem., vol. 234, no. 3, 466-468, 1959).

In the case of obtaining permeate water in a RO membrane treatment or a FO membrane treatment using the permselective membrane of the present invention, a water permeate flow rate of 20 $L/(m^2 \cdot h \cdot atm)$ or more can be obtained at a driving pressure in the range of 0.1 to 30 atm.

As described in detail above, according to the present invention, a phospholipid bilayer comprising amphotericin B as a channel substance can be incorporated into a porous membrane, and a FO membrane and a RO membrane having a high water permeability and a high salt rejection can be obtained. The resulting membrane can be applied to water treatment.

EXAMPLES

Below, Examples and Comparative Examples will now be described. First, the utilized materials, evaluation methods, and the like are described.

<Materials>

[Porous Membrane Body]

In Examples and Comparative Examples below, an anodized alumina membrane (Anodisc, diameter 25 mm, thickness 60 mm, pore diameter 20 nm or 200 nm, GE Healthcare) was used as a porous membrane body.

The 20 nm pore size is a pore size measured by the air flow method described above.

[Phospholipid]

1-Palmitoyl-2-oleoyl-sn-glycero-3-phosphocholine (POPC, phospholipid containing an unsaturated fatty acid on a phospholipid acyl group, phase transition temperature −2° C., NOF Corporation) was used as phospholipid.

[Ergosterol]

Ergosterol of Tokyo Chemical Industry Co., Ltd., was used. Ergosterol is denoted as "Erg" in FIGS. 1 to 3.

[Channel Substance]

Amphotericin B of Cayman Chemical was used as a channel substance. Amphotericin B is denoted as "AmB" in FIGS. 1 to 3.

[Material for Imparting Alkyl Group Having 1 to 30 Carbon Atoms]

As a material for imparting an alkyl group having 1 to 30 carbon atoms, octadecyltrichlorosilane (Sigma-Aldrich), which is a silane coupling agent having an octadecyl group having 18 carbon atoms (hereinafter a "silane coupling agent"), was used.

<Bonding of Alkyl Group to Porous Membrane Body>

In order to cover the porous membrane with a phospholipid bilayer, the porous membrane body was treated with the silane coupling agent as follows.

First, the porous membrane body was immersed in pure water and ultrasonically washed for 5 minutes. Next, a plasma treatment was performed using a desktop vacuum plasma apparatus (YHS-R, SAKIGAKE-Semiconductor Co., Ltd.) to make the surface hydrophilic. This porous membrane body was immersed in a 2 vol % hexane solution of octadecyltrichlorosilane for 15 minutes, then washed with hexane and pure water, and left to stand still overnight at room temperature. The contact angle of a water droplet changed from 13 degrees to 149 degrees due to this treatment.

<Method for Preparing Vesicles and Application to Porous Membrane>

The phospholipid, ergosterol, and channel substance were dissolved in a mixed solvent of chloroform and methanol (an organic solvent). The organic solvent was evaporated under reduced pressure, pure water was added to the dried lipid thin membrane remaining in the container, the mixture was hydrated at 40° C., and thereby a vesicle dispersion was prepared. The resulting vesicle dispersion was subjected to a freeze-thaw method, wherein the vesicle dispersion was alternatively immersed in liquid nitrogen and a hot-water bath at 40° C. five times in a repeated manner, to thereby grow particles. The vesicle dispersion was extruded to regulate the particle size using a track-etched polycarbonate membrane having a pore size of 0.2 μm and diluted with pure water to a phospholipid concentration of 3 mM.

The porous membrane body treated with a silane coupling agent was immersed in this vesicle dispersion for 2 hours to cause phospholipid to be adsorbed onto the membrane body. Thereafter, ultrasonic washing was performed for 10 minutes to strip off excessive phospholipid adsorbed onto the porous membrane body.

<Experiment for Verifying Channel Formation by Channel Substance>

Whether the channel substance introduced into the phospholipid bilayer functions as a water channel substance was verified by measuring the circular dichroism (CD) spectrum of a vesicle dispersion having the same composition as the phospholipid bilayer coating the surface of the porous membrane body using a circular dichroism spectrometer (J-725K, Jasco Corporation).

Figure 2:
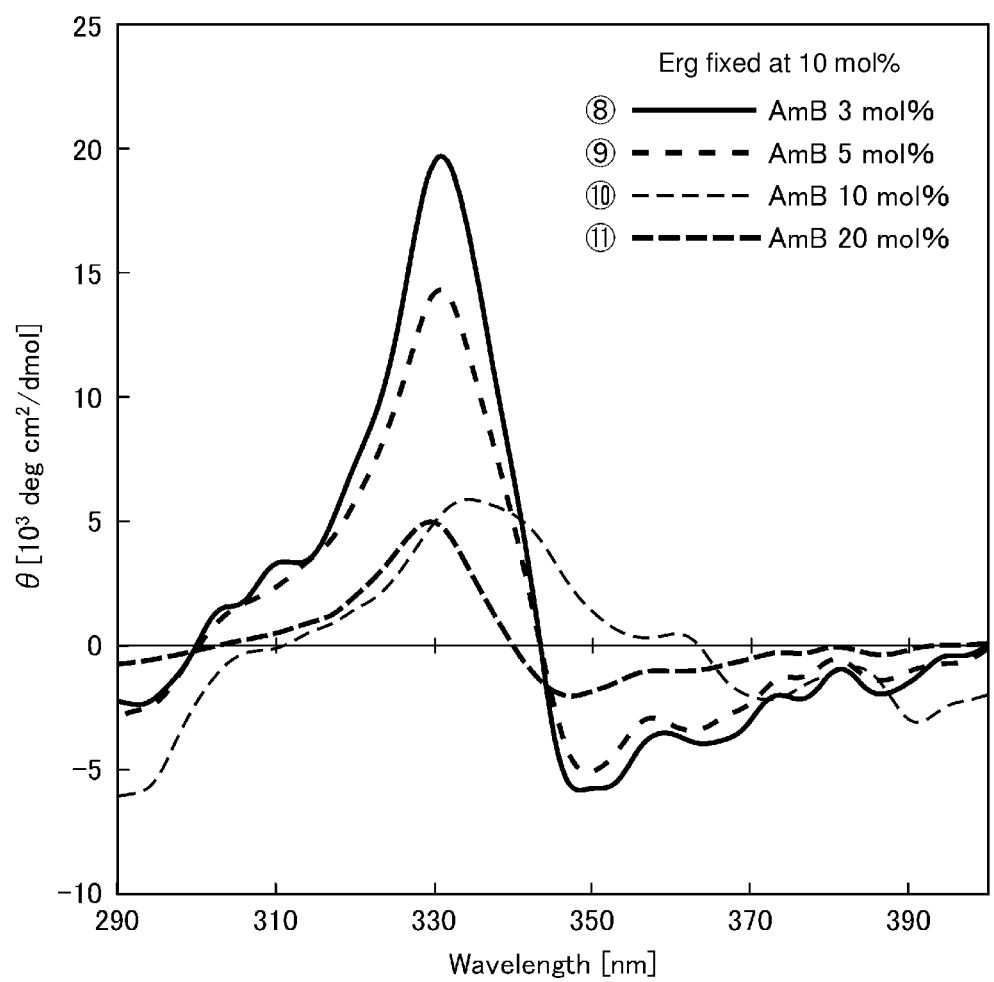
FIG. 2 shows CD spectra for evaluating the channel formation of membranes prepared with the concentration (content) of ergosterol being fixed at 10 mol %.
Figure 3:
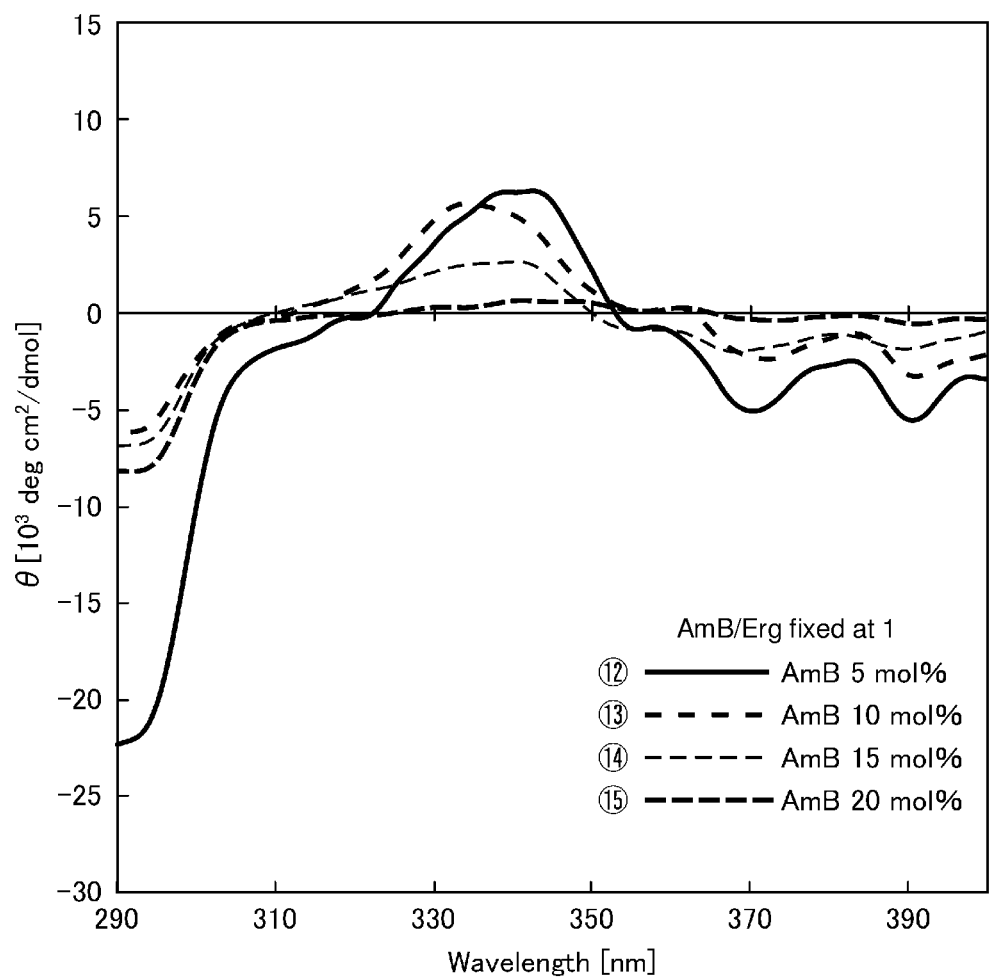
FIG. 3 shows CD spectra for evaluating the channel formation of membranes prepared with the molar ratio of amphotericin B to ergosterol being fixed at 1:1.

FIGS. 1 to 3 show the results of evaluating the channel formation of amphotericin B based on CD spectra.

FIG. 1 is a case where the concentration of amphotericin B (denoted as "AmB" in FIGS. 1 to 3) was 10 mol % while the concentration of ergosterol (denoted as "Erg" in FIGS. 1 to 3) was changed. In the absence of ergosterol, no peak indicating channel formation appears and peaks indicating channel formation appear with ergosterol at 5 to 20 mol %. It was found that no channel is formed when the concentration of ergosterol is increased to 30 mol % or more.

FIG. 2 is a case where the concentration of ergosterol was 10 mol % while the concentration of amphotericin B was changed. It was verified that the concentration of amphotericin B at which channels were formed is 3 to 20 mol %.

FIG. 3 is a case where the molar ratio of amphotericin B to ergosterol is 1:1, and it can be understood that channels are formed when amphotericin B is at 5, 10, and 15 mol %, and no channels are formed at 20 mol %.

Accordingly, in the present invention, the concentrations (contents) of amphotericin B and ergosterol satisfying the channel forming conditions were within the following ranges.

That is to say, the content of amphotericin B in the phospholipid bilayer is 3 mol % to 20 mol %.

Moreover, the total content of ergosterol and amphotericin B in the phospholipid bilayer is 10 to 30 mol %.

<Evaluation of Permselective Membrane Performance>

Figure 4:
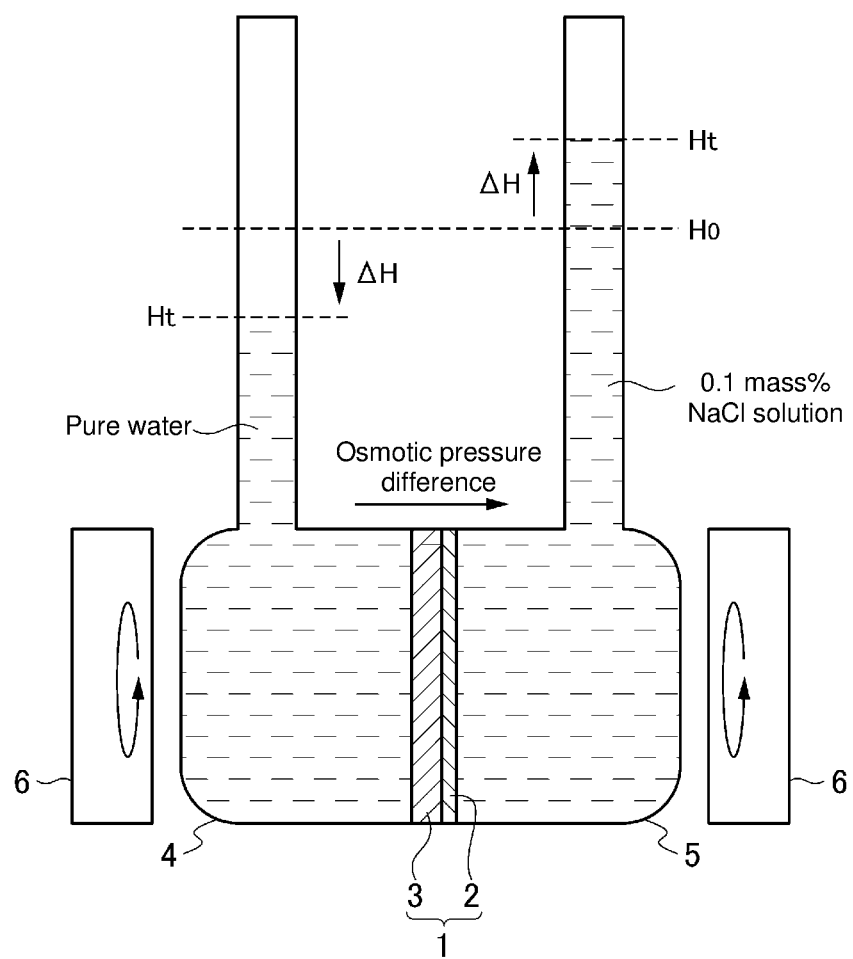
FIG. 4 is a schematic illustrative diagram of a facility for evaluating water permeability and salt rejection properties.

The water permeability and salt rejection properties of the membrane were measured with the experimental apparatus shown in FIG. 4. Pure water was used on the primary side container 4, and a 0.1 mass % aqueous sodium chloride solution was used on the secondary side container 5. A permselective membrane 1 obtained by coating the surface of a porous membrane (body) 2 with a phospholipid bilayer 3 was interposed between the containers 4 and 5. While stirring the containers 4 and 5 with respective magnetic stirrers 6, the water permeation rate from the primary side to the secondary side was measured, and also the sodium chloride concentrations (electrical conductivities) on the primary side and the secondary side after 24 hours were measured to obtain a salt rejection according to expression (1) below:

Salt rejection [%]=(1-Electrical conductivity on primary side/Electrical conductivity on secondary side)×100　　(1)

As for the water permeation rate, an osmotic pressure difference (pressure on secondary side−pressure on primary side) of 0.8 atm was provided under the condition of the above aqueous sodium chloride solution concentration to obtain the water permeate flow at a driving pressure of 0.8 atm, the water permeate flow was divided by the driving pressure, and the result was regarded as the water permeation rate (L/(m$^2$·h·atm)).

The amount of permeate water was calculated using expression (2) where the change in water level is ΔH (cm), the cross-sectional area of a water column is $S_O$ (cm$^2$), the area of a membrane is $S_m$ (m$^2$), and the time is t (s):

Water permeate flow {L/(m$^2$·h)}=3.6·ΔH·$S_O$/($S_m$·t)　　(2)

Example 1

Using 87 mol % of phospholipid POPC, 10 mol % of amphotericin B, and 3 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Example 2

Using 85 mol % of phospholipid POPC, 10 mol % of amphotericin B, and 5 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Example 3

Using 80 mol % of phospholipid POPC, 10 mol % of amphotericin B, and 10 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Example 4

Using 70 mol % of phospholipid POPC, 10 mol % of amphotericin B, and 20 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Comparative Example 1

Using POPC, phospholipid bilayers were applied to a porous alumina membrane having a pore size of 20 nm, and then the water permeation rate and the salt rejection were calculated. No phospholipid bilayers were formed on the porous alumina membrane.

Comparative Example 2

Using POPC as phospholipid, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Comparative Example 3

Using 90 mol % of phospholipid POPC and 10 mol % of amphotericin B, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Comparative Example 4

Using 90 mol % of phospholipid POPC and 10 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Comparative Example 5

Using phospholipid POPC, phospholipid bilayers were applied to an alumina porous membrane having a pore size of 200 nm to which an alkyl group had been bonded by the above-described method, thereby a permselective membrane was obtained on which 1 to 15 phospholipid bilayers were formed, and then the water permeation rate and the salt rejection were calculated.

Comparative Example 6

Using 60 mol % of phospholipid POPC, 10 mol % of amphotericin B, and 30 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

Comparative Example 7

Using 60 mol % of phospholipid POPC, 20 mol % of amphotericin B, and 20 mol % of ergosterol, phospholipid bilayers were applied to an alumina porous membrane having a pore size of 20 nm to which an alkyl group had been bonded by the above-described method, thereby a permselective membrane was obtained on which 1 to 15 phospholipid bilayers were formed, and then the water permeation rate and the salt rejection were calculated.

<Results and Discussions>

Table 1 shows the configurations of the porous membrane, phospholipid bilayer, and channel substance in the Examples and Comparative Examples as well as the water permeation rates and the salt rejections as evaluations thereof.

In Examples 1 to 4, a 50 times or higher water permeation rate was obtained as compared with Non-Patent Literature 3. Moreover, a salt rejection of 98% or higher was obtained.

This is considered to be because by using a porous body having a suitable pore size and applying phospholipid containing suitable molar concentrations of amphotericin B and ergosterol, channels were formed and effectively functioned.

Since no phospholipid bilayer was formed, Comparative Example 1 was not applicable to measurement. In Comparative Example 2, although phospholipid bilayers were applied to the porous body, the water permeation rate was not obtained because the phospholipid bilayers were composed solely of phospholipid, and no channel substance was present. In Comparative Example 3, although channel-substance amphotericin B was present, the water permeation rate was not obtained because ergosterol necessary for channel formation was not present. In Comparative Example 4, although ergosterol was present, the water permeation rate was not obtained because channel-substance amphotericin B was not present. In Comparative Example 5, since the porous membrane had a large pore size of 200 nm, the membrane was not able to withstand the osmotic pressure difference between the primary side and the secondary side and damaged, and therefore a certain level of water permeation rate was obtained despite the absence of amphotericin B and ergosterol. However, water permeability was exerted due to membrane damage, the salt rejection was poor. In Comparative Examples 6 and 7, the sum of the molar concentrations of amphotericin B and ergosterol exceeded 30 mol %, therefore channels were not sufficiently formed, and a sufficient water permeation rate was not obtained.

TABLE 1

| | Porous membrane | | | Phospholipid bilayer | | Channel substance (y) Amphotericin B | | Water permeation | |
|---|---|---|---|---|---|---|---|---|---|
| | | Average | Provision of alkyl group | POPC | (x) Ergosterol | | | | |
| Kind | | particle size nm | Yes/ No | Number of carbon atoms | Concentration mol % | Concentration mol % | Concentration mol % | Sum in mol (x) + (y) | rate L/(m² · h · atm) | Salt rejection % |
| Example 1 | Alumina | 20 | Yes | 18 | 87 | 3 | 10 | 13 | 59.6 | 99.8 |
| Example 2 | Alumina | 20 | Yes | 18 | 85 | 5 | 10 | 15 | 79.6 | 99.7 |
| Example 3 | Alumina | 20 | Yes | 18 | 80 | 10 | 10 | 20 | 28.1 | 98.9 |
| Example 4 | Alumina | 20 | Yes | 18 | 70 | 20 | 10 | 30 | 22.0 | 98.9 |
| Comparative Example 1 | Alumina | 20 | No | | 100 | 0 | 0 | 0 | Not applicable to measurement | Not applicable to measurement |
| Comparative Example 2 | Alumina | 20 | Yes | 18 | 100 | 0 | 0 | 0 | 0.0 | 97.1 |
| Comparative Example 3 | Alumina | 20 | Yes | 18 | 90 | 0 | 10 | 10 | 1.4 | 99.7 |
| Comparative Example 4 | Alumina | 20 | Yes | 18 | 90 | 10 | 0 | 10 | 1.0 | 99.6 |
| Comparative Example 5 | Alumina | 200 | Yes | 18 | 100 | 0 | 0 | 0 | 32.5 | 89.5 |
| Comparative Example 6 | Alumina | 20 | Yes | 18 | 60 | 30 | 10 | 40 | 11.9 | 99.8 |
| Comparative Example 7 | Alumina | 20 | Yes | 18 | 60 | 20 | 20 | 40 | 6.5 | 81.4 |

INDUSTRIAL APPLICABILITY

The permselective membrane of the present invention has excellent water permeability and salt rejection properties, and therefore can be effectively utilized in desalination treatment of sea water and salt water; purification treatment of industrial water, sewage, and tap water; concentration of fine chemicals, pharmaceuticals, foods; and the like. Moreover, the method for producing a permselective membrane of the present invention can be effectively utilized as a method for producing the permselective membrane of the present invention in a highly reproducible manner.

The invention claimed is:

1. A permselective membrane comprising a porous membrane having a pore size of 5 nm to 50 nm and a coating layer made of a phospholipid bilayer and formed on a surface of the porous membrane, wherein
   (i) the phospholipid bilayer comprises a phospholipid, amphotericin B, and ergosterol;

(ii) a content of the amphotericin B is 3 to 20 mol % based on the phospholipid bilayer; and (iii) a total content of the ergosterol and the amphotericin B in the phospholipid bilayer is 10 to 30 mol %.

2. The permselective membrane according to claim 1, wherein an alkyl group having 1 to 30 carbon atoms is bonded to the surface of the porous membrane.

3. The permselective membrane according to claim 1, wherein the phospholipid comprises palmitoyloleoylphosphatidylcholine (POPC).

4. A method for producing a permselective membrane comprising a porous membrane having a pore size of 5 nm to 50 nm and a coating layer made of a phospholipid bilayer comprising phospholipid and a channel substance and formed on a surface of the porous membrane, the method comprising a step of forming the coating layer made of the phospholipid bilayer on the surface of the porous membrane by bringing a coating layer forming liquid satisfying (i) to (iii) below and the porous membrane into contact:

(i) the coating layer forming liquid comprises a phospholipid, a channel substance, and ergosterol;

(ii) the channel substance is amphotericin B, and the coating layer forming liquid has an amphotericin B concentration of 3 to 20 mol %; and (iii) a total content of the ergosterol and the amphotericin B in the coating layer forming liquid is 10 to 30 mol %.

5. The method for producing a permselective membrane according to claim 4, further comprising a step of forming the porous membrane by bonding an alkyl group having 1 to 30 carbon atoms to the porous membrane, the step being performed prior to the step of forming the coating layer made of the phospholipid bilayer on the surface of the porous membrane.

6. The method for producing a permselective membrane according to claim 4, wherein the phospholipid comprises palmitoyloleoylphosphatidylcholine (POPC).

7. A method for treating water, comprising a step of subjecting water to a membrane separation treatment using the permselective membrane of claim 1.

* * * * *